Oct. 25, 1949.  J. E. HARWOOD  2,485,879
BEEHIVE EXIT DEVICE
Filed Nov. 25, 1947
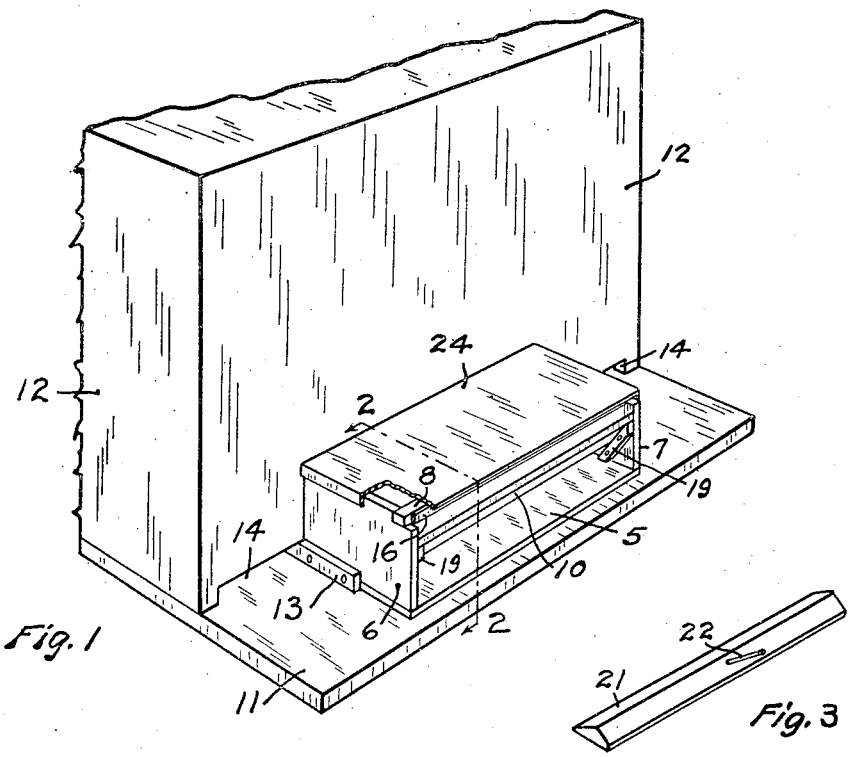
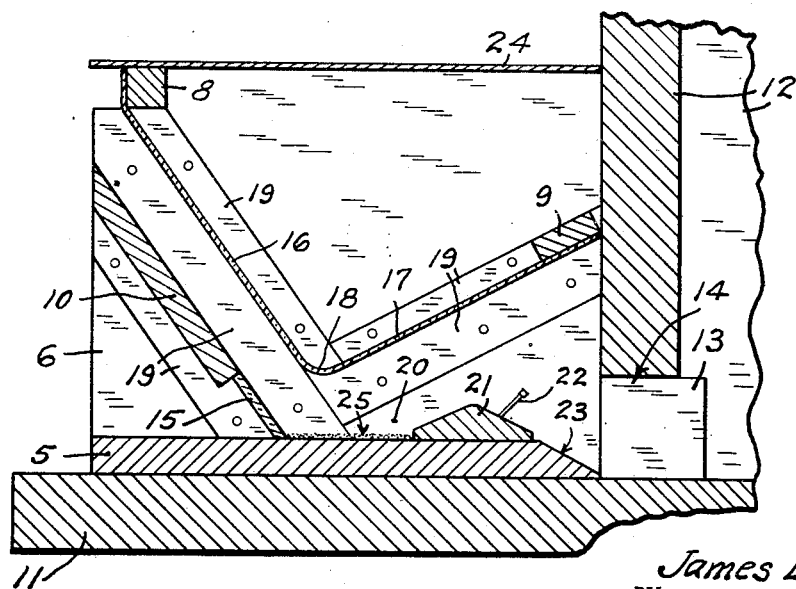
INVENTOR.
James E. Harwood
BY
Fred C. Matheny
ATTORNEY Patented Oct. 25, 1949

2,485,879

UNITED STATES PATENT OFFICE 2,485,879

BEEHIVE EXIT DEVICE

James E. Harwood, Beulah, Mich., assignor to Leo C. Antles, Wenatchee, Wash.

Application November 25, 1947, Serial No. 787,942

7 Claims. (Cl. 6—4)

This invention relates to beehive exit means of a type used to increase the pollination of plant blossoms by honey bees the same being herein referred to as a beehive insert but it being understood that this device may be constructed as an integral part of a beehive.

This invention is in the nature of an improvement in beehive attachments or devices of the type disclosed in Patent No. 2,435,951, issued Feb. 17, 1948, to Leo C. Antles.

It is an object of this invention to provide a device for controlling the activities of honey bees in such a manner that the bees are caused to pick up fertile pollen at a beehive and carry this fertile pollen to blossoms needing the pollen service.

Another object of the invention is to provide a device of this nature adapted to control the exit of bees relative to a beehive and further adapted to contain live or fertile pollen which the bees are caused to come in contact with and pick up and carry away each time they visit the beehive.

Another object is to provide beehive exit means comprising a pollen compartment positioned in the path followed by bees in leaving a beehive said exit means terminating in an upwardly inclined passageway through which the bees must travel after they leave the pollen compartment, at least a portion of the floor of said passageway being of light conductive and preferably transparent material.

Other objects of this invention are to provide a beehive exit means or insert of this nature that is simple in construction not expensive to manufacture and that is highly efficient in controlling the activities of the bees as respects the way they enter and leave the beehive.

Other objects of this invention will be apparent from the following description taken in connection with the accompanying drawings.

In the drawings Figure 1 is a perspective view with parts broken away of a beehive exit device or insert constructed in accordance with this invention showing the same in connection with a beehive, a fragment only of the beehive being shown.

Fig. 2 is a view in cross section through the exit device and a fragment of the beehive taken substantially on broken line 2—2 of Fig. 1 and on a larger scale than Fig. 1.

Fig. 3 is a detached perspective view of a movable or adjustable stop member used in the pollen compartment of this beehive exit device.

Similar reference numerals refer to similar parts throughout the several views.

The frame of this beehive exit device or insert comprises a floor 5, two end walls 6 and 7, two cross bars 8 and 9 and an inclined exit board 10 over which the bees pass in leaving the hive. The floor 5 is adapted to rest on the alighting platform 11 of a beehive 12. A cleat 13 is secured to the end wall 6 and extends into the usual beehive inlet and exit opening or door 14. This opening 14 is provided in the front wall of the beehive 12 flush with the alighting platform 11. Another cleat, similar to the cleat 13 but not shown herein is secured to the other end wall 7 and these two cleats help to anchor the insert to the beehive.

The exit device or insert is of substantially less width than the beehive so that it only obstructs the usual inlet and exit opening 14 of the beehive for a portion of the length of said opening 14. The exit device can be positioned intermediate the length of the opening 14 as shown in Fig. 1 or it can be positioned at one side of the hive, that is at one end of the opening 14. When this exit device is positioned so that it obstructs any part of the opening 14 and leaves any other part or parts of said opening 14 unobstructed it has been found that the bees will enter the beehive through the unobstructed part of the opening 14 and will leave the hive by way of this exit device. This device thus takes advantage of the fact that the bees will enter and leave the beehive as above explained.

The inclined exit board 10 is positioned adjacent the outermost side of this beehive insert and extends crosswise between the end walls 6 and 7. Preferably this exit board 10 is inclined at an angle of about sixty degrees relative to the floor 5 and the bees walk or crawl upwardly across this board 10 in leaving the hive. The bottom edge of the exit board 10 is spaced a short distance above the floor 5, and inclined plate 15 of smooth light conductive and preferably transparent material, such as glass, closes this space between the bottom edge of the board 10 and the floor 5. The plate 15 is flush with the inner surface of the inclined exit board 10 and is positioned at the same angle so that the board 10 and plate 15 present a continuous, flat, inclined ramp or exit surface for the bees to move over as they leave the beehive. An angle shaped guard member comprising two plate like portions 16 and 17 connected by a curved vertex portion 18 is provided in this beehive insert and extends from end to end thereof. Preferably this angle shaped guard member is formed of light conductive material, such as a light conductive plastic material in which screen wire is embedded, this being an easily obtainable, inexpensive and durable material much used in the poultry industry.

The plate member 16 is positioned substantially parallel to the innermost surface of the exit board 10 and preferably spaced about three eighths of an inch therefrom. Thus a passageway about three eighths of an inch wide and extending from end to end of the beehive insert is provided for the bees to move outwardly through. The plate like member 17 extends from the vertex portion 18 inwardly and upwardly, preferably at an angle of about thirty degrees, to the inner side of the insert, this being the side which is positioned against the beehive. The uppermost edge portion of the plate like member 16 is secured to the cross bar 8 and the corresponding edge portion of the plate like member 17 is secured to the cross bar 9.

Suitable end cleats 19 are provided where needed on the end members 6 and 7 to cooperate in helping to support the exit board 10, light conductive plate 15 and guard plates 16 and 17. These end cleats also help to secure the parts 10, 15, 16 and 17 to the end members 6 and 7.

The space on and immediately above the floor 5 inwardly from the glass plate 15 constitutes a pollen receptacle 20 in which fertile pollen 25 can be placed in the path of bees leaving the beehive. Preferably an adjustable stop member 21 of gable shaped cross section, as shown in Figs. 2 and 3, is disposed on the floor 5 to serve as a pollen retaining member in spaced relation from the light conductive plate 15. A small nail 22 can be used to serve as a handle by which the stop member 21 can be handled and adjusted. Preferably the inner edge portion of the floor 5 is beveled, as at 23, to provide a better approach for bees as they leave the beehive.

The use of a cover member 24 on the top of this beehive insert is optional. Such a cover member is shown in the drawings but can be omitted if desired. If a cover member is used it can be made of opaque material such as sheet metal or can be made of material that will transmit any desired amount of light. Also the cover member can be inclined, if desired, to shed water.

The light conductive plate 15 has been found to be of great advantage in inducing the bees to leave the hive by way of this insert. This light conductive plate 15 and the exit board 10 form the inclined front wall of the pollen compartment and help to prevent waste of pollen, which is costly because of its perishable nature and because of the labor involved in gathering it. Pollen adheres to the bees when they pass through the pollen compartment. Some of this pollen which adheres loosely, will be dropped as the bees move up along the light conductive plate 15 and exit board 10 and will tend to find its way back into the pollen compartment 20 or will be picked up by other bees. Some of the pollen which adheres firmly to the bees will be carried to blossoms in which the bees work. The inclined exit board 10 and light conductive plate 15 further shield the pollen from drafts of air which might tend to scatter and waste it.

The light conductive plate 15 admits a strip of light across the floor in front of the bees that are moving outwardly. This plate 15 is of smooth material such as glass, and this smoothness and the strip of light admitted by said plate 15 both seem to hasten the movement of the bees to and along inclined ramp formed by this plate 15 and the exit board 10.

The stop member 21 can be moved to adjust the floor area of the pollen compartment. This stop member also cooperates to prevent scattering and waste of the pollen.

The operation of this beehive insert may be summarized as follows:

Live pollen is placed in the pollen compartment 20 and the beehive exit device is positioned with its inner side against the front wall of the beehive so as to leave parts of the opening 14 unobstructed. The bees will enter the hive through the unobstructed portions of the opening 14 and it has been found that substantially all of the bees will come out of the hive by way of this device.

In coming out of the hive the bees crawl or walk up the incline 23, over the stop 21 through the pollen 25 in the pollen compartment 20 and up along the ramp formed by the light conductive plate 15 and exit board 10.

The light conductive plate 15 has been found to be important as the bees will advance to this plate and then upwardly along this plate and the board 10 much more freely than they will if the board 10 is extended entirely to the floor 5 or if an opaque plate is used instead of the light conductive plate 15.

The foregoing description and accompanying drawings clearly disclose a preferred embodiment of my invention but it will be understood that this disclosure is merely illustrative and that changes can be made within the scope and spirit of the following claims.

I claim:

1. Beehive exit means comprising a floor and two upright spaced apart walls defining an exit way from a beehive; a pollen compartment provided on said floor in the path of bees leaving the beehive by way of the exit means, and an inclined exit ramp positioned outwardly from said pollen compartment and extending from the floor upwardly and outwardly, a portion of said exit ramp adjacent the floor being of light conductive material and the upper portion of said exit ramp being of opaque material.

2. Beehive exit means comprising a floor and two spaced apart walls cooperating to define an exit way from a beehive; a pollen compartment provided on said floor in the path of bees leaving the beehive by way of the exit means; and an inclined exit ramp positioned outwardly from said pollen compartment and extending from said floor upwardly and outwardly, a portion of said exit ramp adjacent said floor being of transparent glass.

3. Beehive exit means comprising a floor and two upright spaced apart walls defining an exit way from a beehive; a pollen compartment provided on said floor in the path of bees leaving the beehive by way of the exit means; an inclined exit ramp positioned outwardly from said pollen compartment and extending from the floor upwardly and outwardly, a portion of said exit ramp adjacent the floor being of light conductive material and the upper portion thereof being of opaque material; and an inclined guard member supported in spaced relation from said exit ramp and cooperating therewith to provide a bee exit passageway between the guard member and the ramp.

4. Beehive exit means comprising a floor and two upright spaced apart walls defining an exit way from a beehive; a pollen compartment provided on said floor in the path of bees leaving the beehive by way of the exit means; an adjustable stop member between the pollen compartment and the beehive and an inclined exit ramp positioned outwardly from said pollen compartment and extending from the floor upwardly and outwardly, a portion of said exit ramp adjacent the floor being of light conductive material.

5. Beehive exit means comprising a floor and two upright spaced apart walls defining an exit way from a beehive; a pollen compartment provided on said floor in the path of bees leaving the beehive by way of the exit means; an inclined exit ramp positioned outwardly from said pollen compartment and extending from the floor upwardly and outwardly, a portion of said exit ramp adjacent the floor being of light conductive material; an inclined guard member supported above the pollen compartment; and another inclined guard member positioned substantially parallel to said exit ramp and spaced inwardly from said exit ramp and cooperating with said exit ramp to provide a bee exit passageway between the last mentioned guard member and the exit ramp.

6. Means for increasing the pollination activities of bees using a beehive located in the vicinity of blossoms to be pollinated, comprising beehive exit means adapted to obstruct a portion of the usual doorway to the beehive, another portion of said usual doorway being left open and unobstructed to provide a bee entrance, said beehive exit means comprising a floor and two spaced apart end walls; a pollen compartment provided on said floor in the path of bees leaving the beehive by way of the exit means; and an inclined exit ramp positioned outwardly from said pollen compartment and extending from the floor upwardly and outwardly, a portion of said exit ramp adjacent the floor being of light conductive material.

7. Beehive exit means comprising a floor and two spaced apart walls cooperating to define an exit way from a beehive; a pollen compartment provided on said floor in the path of bees leaving the beehive by way of the exit means; an adjustable stop member between the pollen compartment and the beehive; an inclined exit ramp positioned outwardly from said pollen compartment and extending from the floor upwardly and outwardly, a portion of said exit ramp adjacent the floor being of light conductive material; an inclined guide member supported above the pollen compartment; and another inclined guard member connected with said first mentioned guard member and positioned substantially parallel to and in spaced relation from said exit ramp.

JAMES E. HARWOOD.

REFERENCES CITED

The following references are of record in the file of this patent:

UNITED STATES PATENTS

| Number | Name | Date |
| --- | --- | --- |
| 2,435,951 | Antles | Feb. 17, 1948 |